United States Patent [19]

Shapiro

[11] Patent Number: 4,720,785

[45] Date of Patent: Jan. 19, 1988

[54] COMPUTER-ASSISTED SYSTEM FOR TICKETING MANAGEMENT

[75] Inventor: Bernard Shapiro, Montclair, N.J.

[73] Assignee: AI Computer Services, Inc., Fresh Meadow, N.Y.

[21] Appl. No.: 746,624

[22] Filed: Jun. 19, 1985

[51] Int. Cl.⁴ ............................................. G06F 15/20
[52] U.S. Cl. .................................... 364/401; 235/384; 235/378
[58] Field of Search ....................... 364/401, 406–408, 364/467, 464, 900; 235/378, 384, 385

[56] References Cited

U.S. PATENT DOCUMENTS

| | | | |
|---|---|---|---|
| 3,705,976 | 12/1972 | Platzman | 235/384 |
| 3,816,707 | 6/1974 | Kleinmeyer et al. | 364/467 |
| 4,257,551 | 3/1981 | Buchmann | 235/378 |
| 4,310,890 | 1/1982 | Thehn et al. | 364/467 |
| 4,337,890 | 7/1982 | Buchmann | 235/378 |
| 4,450,535 | 5/1984 | de Pommery et al. | 364/900 |
| 4,481,412 | 11/1984 | Fields | 235/385 |
| 4,550,246 | 10/1985 | Markman | 235/385 |
| 4,571,490 | 2/1986 | Hidemi et al. | 235/384 |
| 4,591,705 | 5/1986 | Toudon | 235/385 |
| 4,603,390 | 7/1986 | Mehdipour et al. | 364/467 |

Primary Examiner—Jerry Smith
Assistant Examiner—Kim Thanh Tbui
Attorney, Agent, or Firm—Lilling & Greenspan

[57] ABSTRACT

A computer-assisted ticketing device, such as for garages, provides the necessary functions to allow check in and check out, computing the price, printing tickets, displaying appropriate information on a monitor and producing selected reports. The input to the system is produced by the reading of ticket information from specially designed tickets imprinted with bar code data. Additional information is entered into the system by reading bar code data representing, for example, the make of the vehicle, its color, the pricing schedule, etc. All the information is checked for validity and stored in the system's memory, including the time of day and date. System passwords may be used to prevent unauthorized access to the stored information or the unauthorized printing of reports.

29 Claims, 16 Drawing Figures

FIG.3

SUPERVISORY CARD

PASSWORD CARD

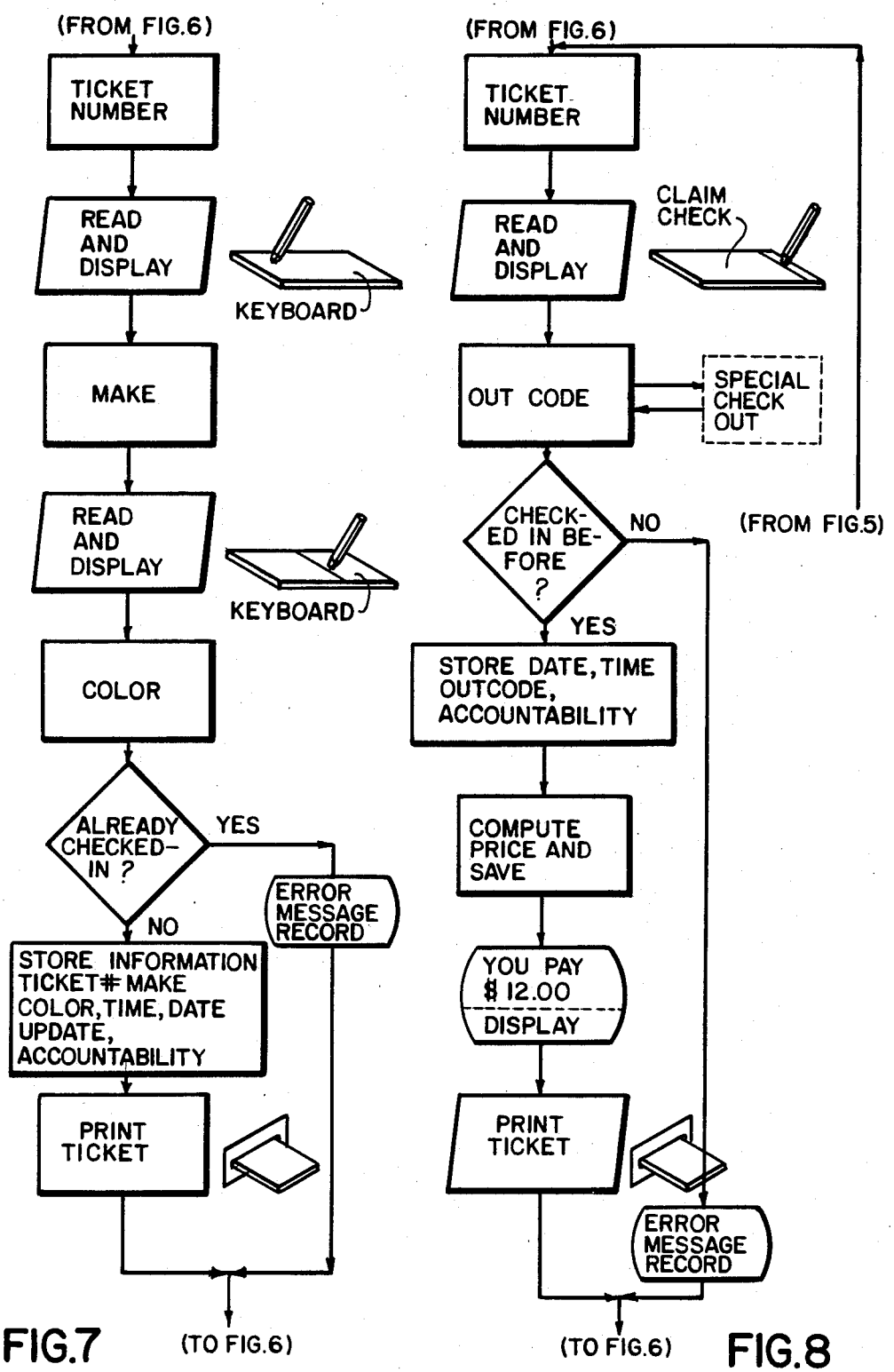

```
OPEN TICKETS GAR.01  06/14/85  5:52PM

TICKET      DATE      TIME      MAKE    COL 10208       06/14     7:57AM    AMC     BLK
10213       06/14     8:01AM    OTHER   OTH
10214       06/14     8:01AM    SAAB    WHI
10215       06/14     8:05AM    OTHER   BLK
10220       06/14     1:51PM    JAG     GRY
10222       06/14     2:55PM    DATSU   BRN
10226       06/14     2:55PM    PORSH   BLU
10227       06/14     4:50PM    CHEVY   RED
10228       06/14     4:50PM    PLYM    GRN

NUMBER OF CARS:  9
```

FIG.13

```
PAID TICKETS GAR.01  06/14/85  5:52PM

TICKET          CASH        CHARGE
10210                       19.00
10212           22.00
10216           19.00
10219           10.00
10221           16.00
10224           16.00                    **

TOT.CASH:       83.00
```

```
DEPOSIT          GAR.01  06/14/85  5:53PM

1 TICKETS @  $  10.00         10.00
   2 TICKETS @  $  16.00         32.00
   1 TICKETS @  $  19.00         19.00
   1 TICKETS @  $  22.00         22.00

TOT.CASH $  83.00
```

FIG.16

```
*** TICKET ACCOUNTABILITY ***
GAR.01    06/14/85   5:53PM

FROM   10218   TO   10239  BATCH

10218  UNUSED
                    10219  CLOSED
                    10220  OPEN
                    10221  CLOSED
                    10222  OPEN
                    10223  UNUSED
                    10224  CLOSED
                    10225  UNUSED
FROM   10226   TO   10228  OPEN
FROM   10229   TO   10239  UNUSED

UNASSIGNED TICKETS      BATCH
```

COMPUTER-ASSISTED SYSTEM FOR TICKETING MANAGEMENT

BACKGROUND OF THE INVENTION

This invention generally relates to a computer-assisted system for ticketing management and, more specifically, to an electronic cash register and supervisory device for garages.

As an intelligent clock, a computer-based system is designed to replace the traditional recording time clock which is used in virtually all attendant-operated parking lots and garages. Industry sources estimate that there are over 10,000 such parking locations in the United States.

While no precise estimate of losses due to inefficiency and/or misappropriation is presently available, a 5% to 10% loss is generally accepted and informally used by management. Most of the equipment which is available is directed to the fully unattended garages, such as municipal parking garages, airports, etc. As suggested, problems can and do arise primarily in valet-type parking garages which suffer losses as a result of skimming, pigging backing of tickets, under pricing, as well as legitimate errors in computation.

The major benefit of the subject invention is to substantially improve the control and accountability for revenues generated from daily parkers in a garage who normally pay the attendant directly, and in cash.

Compared to a recording time clock, the new system will provide automatic controls in the check out and pricing of parking tickets, replacing manual operations and decisions presently left to the attendant. These include:

(1) Pricing of tickets ... calculating time and money, and optionally visually displaying the fee to the customer.

(2) Preparing a printed customer receipt.

(3) Preparing and-of-shift control tapes for paid tickets, overnights, voids and missing tickets.

(4) Preparing on-demand car inventory printouts for on-site audits.

(5) Requiring physical presence of the claim check in order to clock-out and price a ticket.

(6) Automatically accounting, by ticket number, for all pre-numbered ticket forms assigned to the garage location.

SUMMARY OF THE INVENTION

Accordingly, it is an object of the present invention to provide a computer-assisted system for ticketing management, particularly for use in garages, which does not have the disadvantages of prior art systems and devices.

It is another object of the invention to provide a system which prevents tampering by garage attendants.

It is still another object of the present invention to provide a system of the type under discussion which reduces or substantially eliminates the losses due to inefficiency and/or misappropriation in parking garages.

It is yet another object of the present invention to provide a computer-assisted system for ticketing management which prepares printed customer receipts and end-of-shift control tapes for paid tickets, overnights, voids and missing tickets.

It is a further object of the present invention to provide intelligent garage ticketing system which prepares on-demand inventory printouts for on-site audits, of car and ticket form inventories.

It is still an additional object of the present invention to provide a system as suggested in the previous objects which imposes discipline and control on the attendant's use of the equipment.

It is yet an additional object of the present invention to provide an electronic cash register and supervisory device for garages which is readily software expandable and can be offered with numerous software options, including data collection, monthly parking management, credit card sales, etc. In order achieve the above objects, as well as others which will, become apparent hereafter, a computer-assisted system for ticketing management of a plurality of elapsed time events ("event") in accordance with the present invention comprises scanning means for scanning tickets and detecting ticket indicia provided on the tickets, each of which identifies a predetermined event. Data entry means is provided which includes input indicia which can be detected by said scanning means for generating input data which further defines each predetermined event. Computer means is provided which is programmed to check in each ticket at the commencement of an event, including receiving, validating and storing data representing ticket and input indicia, and to check out each ticket at the termination of the event, including receiving, validating and processing data representing ticket and input indicia and to provide output data representative of each event. Printer means is provided for imprinting each ticket with selected data at check in and check out and for printing reports which include selected output data.

Although the computer-assisted system for ticketing management can be used in many environments and has numerous applications, the specific embodiment described herein is for a bar coded electronic cash register and supervisory device for garages, wherein the ticket and input indicia are in the nature of bar codes, and said scanning means is in the nature of a bar code reader.

BRIEF DESCRIPTION OF THE DRAWINGS

The above and other objects of this invention will become more apparent from the following description of a presently preferred embodiment of this invention taken in conjunction with the accompanying drawings, wherein:

FIG. 3 is an enlarged view of a bar code keyboard shown FIG. 1;

FIGS. 6-12 illustate flow charts of the software for initiating the system, checking in a ticket, checking out a ticket, imprinting a ticket and printing selected reports;

FIG. 13 is a sample "open tickets" report;
FIG. 14 is a sample "paid tickets" report;
FIG. 15 is a sample "deposits" report; and
FIG. 16 is a sample "accountability" report.

DESCRIPTION OF THE PREFERRED EMBODIMENT

Figure 1:
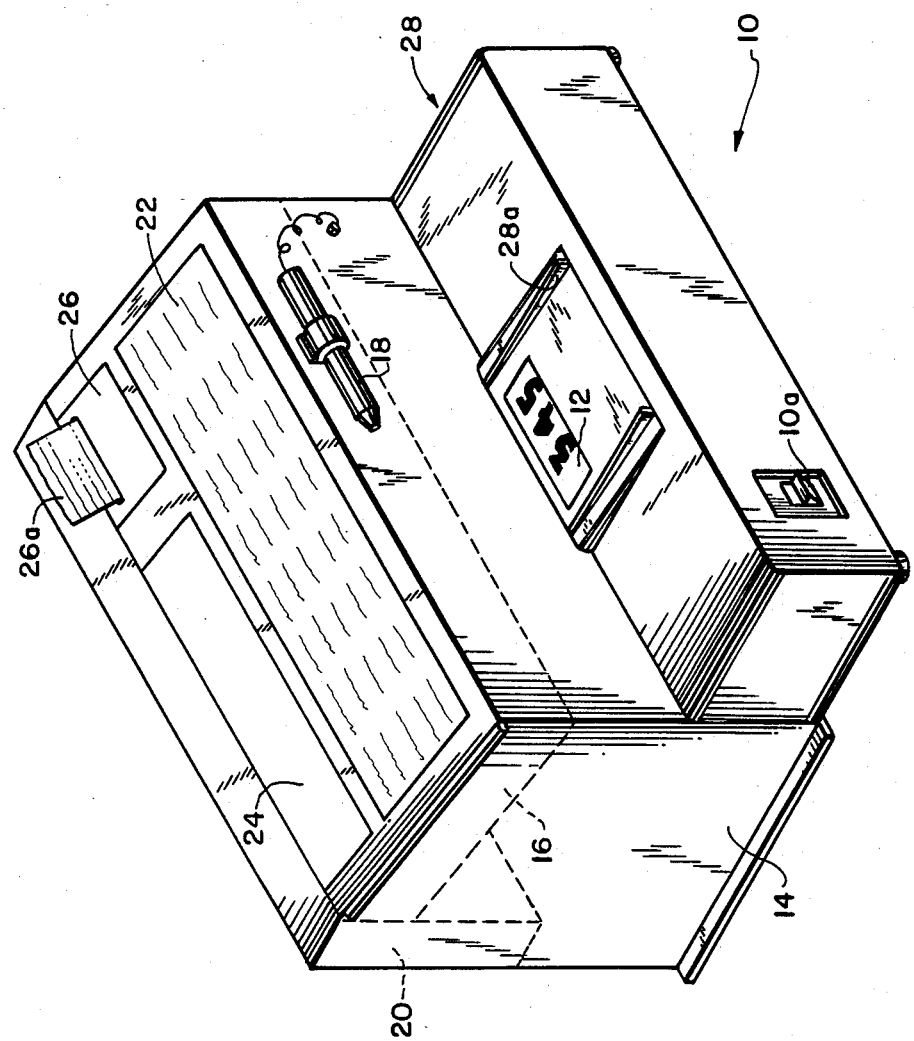
FIG. 1 is a bar chart electronic cash register and supervisory device for garages in accordance with the present invention, showing a parking ticket received within the device for being imprinted and showing a tape being created which contains one of a number of selected reports.

Referring now specifically to the Figures, in which identical or similar parts are designated by the same reference numerals throughout, and first referring to FIG. 1, a computer-assisted system or device for ticketing management of a plurality of events in accordance with the present invention is generally designated by the reference numeral 10. In the specific embodiment to be described, the device 10 is in the nature of a bar chart electronic cash register and supervisory device particularly useful for attended garages or parking areas with valet parking.

Figure 2:
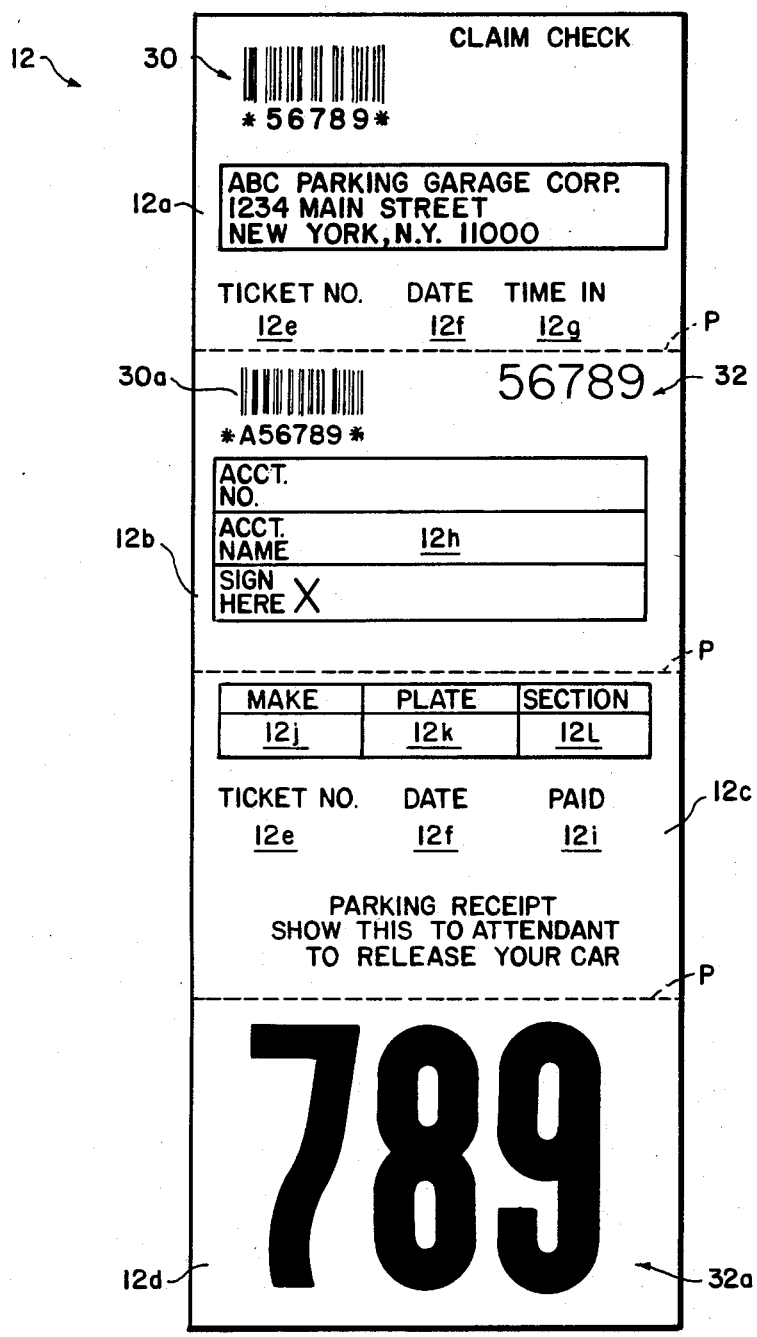
FIG. 2 illustrates a multi-part parking ticket in accordance with the present invention, illustrating two separate detachable portions each imprinted with a ticket indicia in the nature of a bar code.

The device 10 is intended to be used with a customized ticket 12, as shown in FIG. 2, to be more fully described hereafter. The device 10 includes a housing 14 which contains a microprocessor based circuit or microcomputer. The specific computer used is not itself critical, although a microcomputer or portable computer is advantageously used in the interest of reducing the overall size of the device 10. One example of a computer which can and has been used for this purpose is the portable computer manufactured by Epson America, Inc. of Torrance, Calif. and sold under the model designation "HX-40." The specifications of this portable computer are described in specifications published by Epson America, Inc. in publication No. CPD-126-1184-10-C (1984).

Scanning means is provided for scanning tickets 12 and detecting ticket indicia provided on the tickets, each of which identifies a predetermined event. In the presently preferred embodiment, the scanning means includes a bar code pencil or reader 18 which cooperates with a bar code controller 20. Again, the specific reader used is not critical. However, one example of such a device is one sold by Bar Code Industries, Inc. of New York, N.Y. and sold under the designation "MR-300 Bar Code Reader." This device is described in publication No. R.C.B323317479, published by Bar Code Industries, Inc.

The bar code reader 18 is intended to be used for scanning coded data. A number of different codes have been devised and the specific bar code which is used is not critical. Various bar codes and the principles of scanning such codes are described in the aforementioned Bar Code Industries, Inc.'s publication as well as in application note 1013, entitled "Elements of a Bar Code System", published by Hewlett Packard, published November, 1983.

Figure 3:
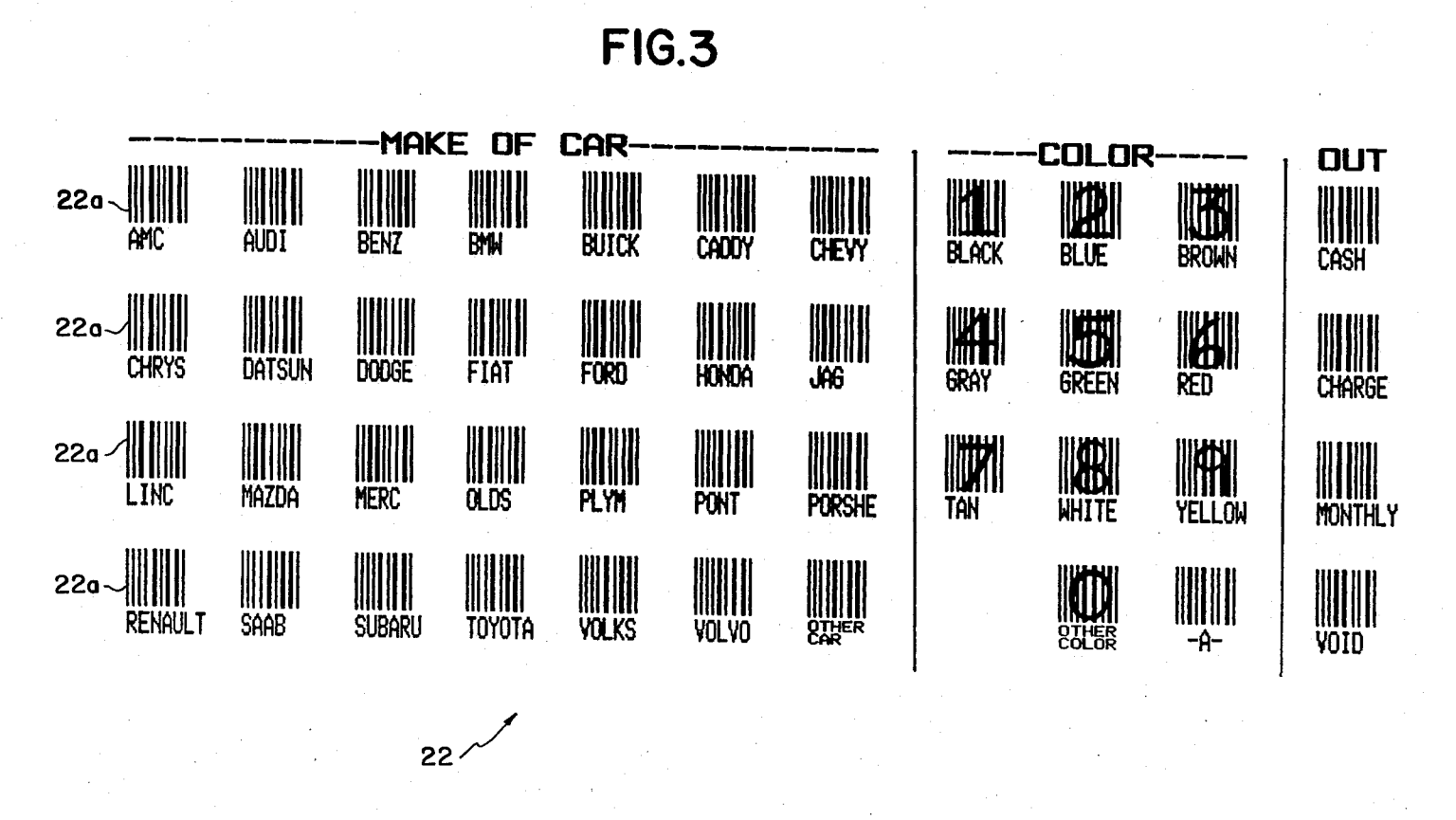

A data entry means in the nature of a bar code keyboard 22 is provided for real time data entry by use of the bar code reader 18. An enlarged view of the bar code keyboard is illustrated in FIG. 3 and is shown to be composed of an array of auxiliary input indicia 22a each of which can be detected by the bar code pencil 18 for generating input data which defines a predetermined event, in this case the parking of an automobile. The bar code keyboard 22 is shown to include a first group of indicia, each of which identifies a different make of car, a second group of input indicia each of which defines a color of a car and a third group of input indicia more in the nature of control codes for establishing the mode of payment. Advantageously, there is provided a display 24, such as a LED display, which visually outputs selected data, such as the ticket number, the total charge for the transaction, the time, and the like. The embodiment being described, the Epson "HX-40" portable computer is provided with an adjustable 240×64.LCD display for illustrating 40 characters on eight lines of text.

A printer is provided for imprinting each ticket 12 with selected data at check in and check out and for printing reports which include selected output data. While it is possible to utilize a single printer for both purposes, the device 10 is shown to include two separate printers 26, 28. The printer 26 may be a tape or journal-type printer for printing reports on a tape 26a. Epson America, Inc. offers a 40-micro-column printer which it sells as an option M-164 for use with the "HX-40" portable computer. The printer 28 is a ticket printer for imprinting data on multi-part forms. One such printer that can be used is ticket printer model No. 4002 sold by Eaton Corporation of Watertown, Wisconsin. The ticket printer 28 is provided with a document guide 28a for guiding the ticket 12 into the printer for imprinting, and with a power "on"/"off" switch and indicator 10a for actuating the device. The model No. 4002 is designed to print on standard 3.25" wide forms which is a standard business size for multiple part documents.

All of the elements or components which make up the device 10 are, as noted, off-the-shelf components each of which are provided with input and output ports and interfaces for interconnecting these units to each other in a manner which is readily known to those skilled in the art.

Referring more specifically to FIG. 2, the parking ticket 12 is shown to be a multi-part ticket including four ticket portions 12a–12d which can be severed at perforation lines P to provide a plurality of such ticket portions. The specific number of multiple parts or ticket portions which can be severed is not critical, and the specific ticket or form used will depend on the specific application. An important feature of the ticket, however, is that a first portion 12a which is provided to the customer after check in is provided with a ticket indicia 30. The ticket portion 12a is generally referred to as machine-readable "claim check" and is required to be presented to the cashier when calling for the parked car. The ticket indicia 30, in this example, is in the nature of a bar code as aforementioned. As will be more fully described hereafter, the bar code 30 is utilized both to check in the car as well as to check it out. In accordance with an advantageous feature of the ticket 12, the second ticket portion 12b, which serves as a control portion, is also provided with a bar code 30a which is related to but different from the ticket indicia 30. Each of the indicia 30, 30a is useable during check out procedures in an alternate check out mode in instances where the claim check 12a has been lost. However, because the ticket indicia 30, 30a are different, possibly only in the respect that one of these indicia is provided with a different prefix or suffix, the computer 16 is advantageously programmed to distinguish between these two ticket indicia and make a record of which one was used during the check out procedure.

The claim check 12a is provided with spaces 12e, 12f and 12g for imprinting by the ticket printer 28 of the ticket number, the date of check in and the time of check in, respectively. The ticket number printed in space 12e should, of course, correspond to the ticket number incorporated in the bar code 30 and this can be used to confirm that the proper ticket number has been entered into the computer.

The control ticket portion 12b is also imprinted with the ticket number 32 in Arabic numerals, as well as with spaces 12h for the account number, account name and signature of the customer. The ticket portion 12b can, therefore, be utilized for those customers which have an account with the parking facility or have another charge account to which the parking fees can be charged.

The ticket 12 also includes a car release or authorization ticket portion 12c which also includes spaces 12e and 12f for the ticket number and date of check in imprinted when this information is printed on the claim check 12a. Additionally, the ticket portion 12c is provided with a space 12i where the parking fee or charge can be imprinted upon check out. The ticket portion 12c can serve as a parking receipt which is to be given to the parking attendant after check out. Additionally, the ticket portion 12c is provided with spaces 12j, 12k and 12l which are imprinted with information regarding the make of the car, the license plate of the car and the section of the garage where the car has been parked, all this information facilitating the retrieval of the car by the attendant.

The remaining ticket portion 12d simply bears the last three digits of the ticket number in large or bold print, suitable for placement on the windshield of the automobile to facilitate rapid identification of the car to be retrieved.

Figure 4:
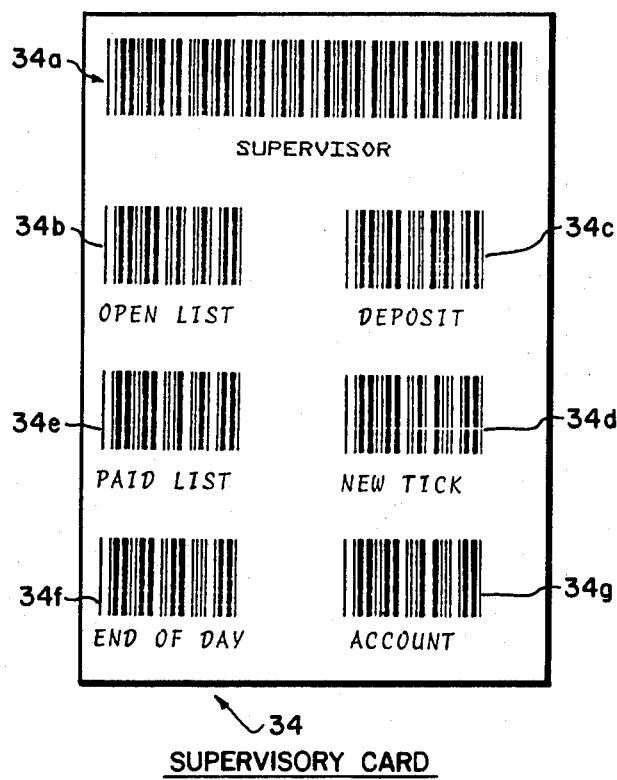
FIG. 4 depicts a supervisory authorization card provided with various report indicia which allows supervisory personnel to cause selected reports to be printed.

According to one feature of the invention, there is advantageously provided authorization means for only enabling the computer 16 and the printer 26 to print reports, of the type to be described hereafter, authorized by the authorization means. In accordance with one embodiment of the authorization means, referring to FIG. 4, a supervisory authorization card 34 is provided with authorization indicia 34a–34g which can be scanned by the bar code pencil 18. As will be noted, the authorization indicia includes a personnel or supervisory identification indicia 34a and various report indicia 34b–34g, respectively requesting or authorizing an open list report, a deposit report, a paid list report, a new ticket report, an end-of-day report, and an account report. With the authorization card 34, authorized personnel can scan selected report indicia for causing corresponding reports to be printed.

Figure 5:
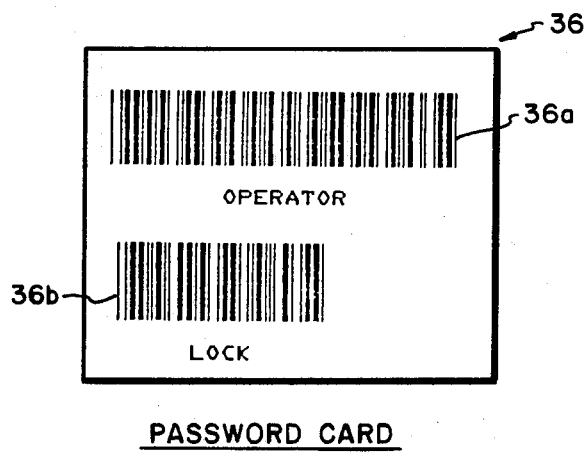
FIG. 5 illustrates a locking card provided with inhibiting or locking indicia which permits authorized personnel or operator of the device to inhibit further of the device or system.

The authorization card 34 is in the nature of a password card which provides access to data not normally accessible. A second password card is illustrated in FIG. 5 and may be provided to serve as an inhibiting means for selectively inhibiting the continued operation of the device 10. In this way, an operator can cease to attend the system without the danger of unauthorized use thereof. The password card in FIG. 5 is in the nature of a locking card 36 which with inhibiting indicia which can, likewise, be scanned by the bar code pencil 18. The inhibiting indicia 36a includes personnel identification indicia and a locking indicia or code 36b. If, for some reason, an attendant must leave the device 10 unattended, he can scan the two indicia on the locking card 36 and effectively terminate all input and output functions.

The computer 16 is programmed to check in each ticket 12 at the commencement of an event which, in the case of a parking garage, consists of the checking in and the checking out of a car of the garage. Check in includes receiving, validating and storing data representing the ticket indicia or number 30 and input indicia selected from the bar code keyboard 22. The computer 16 is also programmedC to check out each ticket 12 at the termination of the event or parking transaction including receiving, validating and processing data representing the ticket indicia 30, and input indicia from the bar code keyboard 22, and to provide output data representative of each such event or transaction. The ticket printer 28 imprints each ticket 12 with selected data as aforementioned at check in and check out and the printer 26 prints reports which include selected output data, to be more fully described below.

Figure 6:
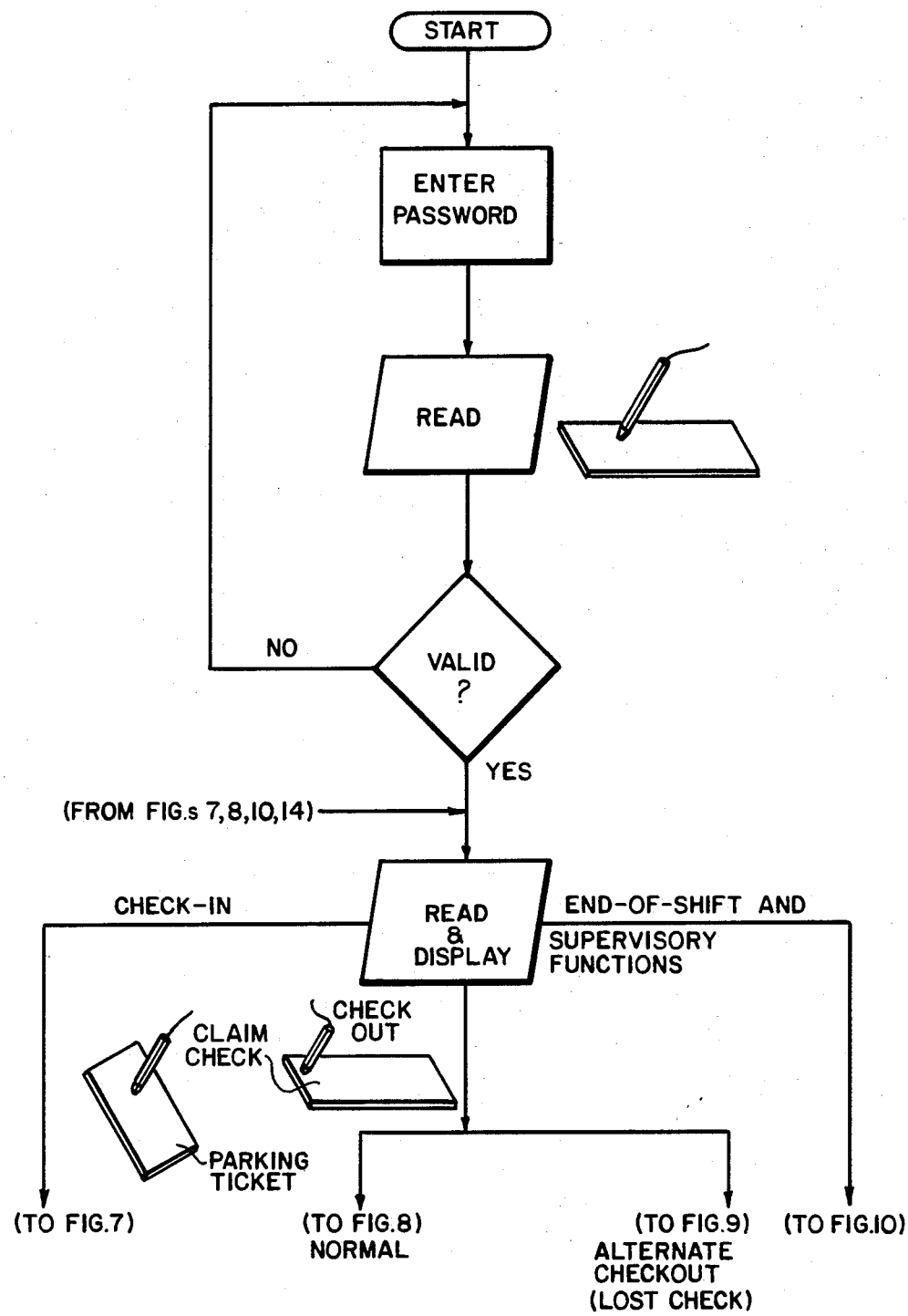

In order to achieve the desired functions as well as to provide flexibility and expandability of the system, the computer 16 is advantageously programmed to execute a plurality of program modules in producing the output data. Referring to FIGS. 6–12, one of the program modules is diagrammatically illustrated in flow chart form. This program module receives the data representing the ticket indicia 30 and input indicia. In FIG. 6, the employee card with bar coded password is scanned or read into the computer and checked for validity. If the password is valid, the user can select one of a number of sub-routines, including check in (FIG. 7), check out (FIG. 8), alternate check out (FIG. 9), generation of selected reports (FIG. 10), generate an end-of-day report and/or accountability report (FIG. 11), or maintain or update the accountability file (FIG. 12).

In the check in mode or sub-routine, it will be noted that following the entry of the input indicia, a check is made as to the validity of the ticket number. If the ticket number has already been checked in, an "error" message is issued, and the attempt to check in an invalid number is recorded. If the ticket number has not been previously checked in, the data representing the ticket and input indicia is stored, as is the date and time of check in, followed by the printing of the selected data on the ticket portions 12a and 12c as aforementioned.

Similarly, in the check out sub-routine or mode, FIG. 7, a check is made following the entry of the ticket indicia from the claim check. If the ticket number sought to be checked out has not been previously checked in, an "error" message is issued and a record is made of the attempt. If the ticket number has been previously checked in, the ticket number is found to be valid and the date and time of check out is stored. Optionally, an out code can be selected to specify cash, charge, monthly customer, or special fees or charges. When this option is provided, the specific out code selected is, likewise, stored following validation of the check out ticket number.

Still referring to FIG. 8, wherein a charge is to made for the elapsed time between check in and check out in accordance with fee schedules, each represented by an out code, the check out sub-routine further computes the fee based on the selected out code and advantageously displays and saves the price to be charged. This latter information is, likewise, printed on the parking receipt ticket portion 12c.

Figure 9:
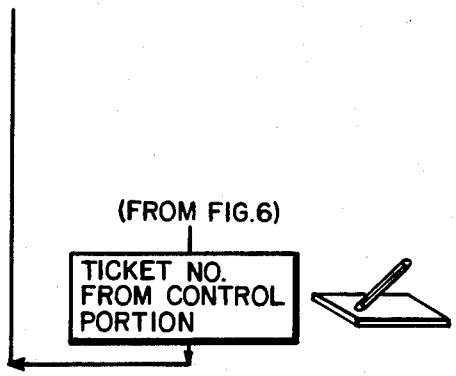

In FIG. 9, the alternate mode of check out is suggested, wherein the claim check 12a has been lost or misplaced. Here, the garage attendant can utilize the control ticket portion 12b as suggested above, and check out can be effected in the customary manner once the customer signs the control ticket portion thereby verifying loss of the claim check.

Figure 10:
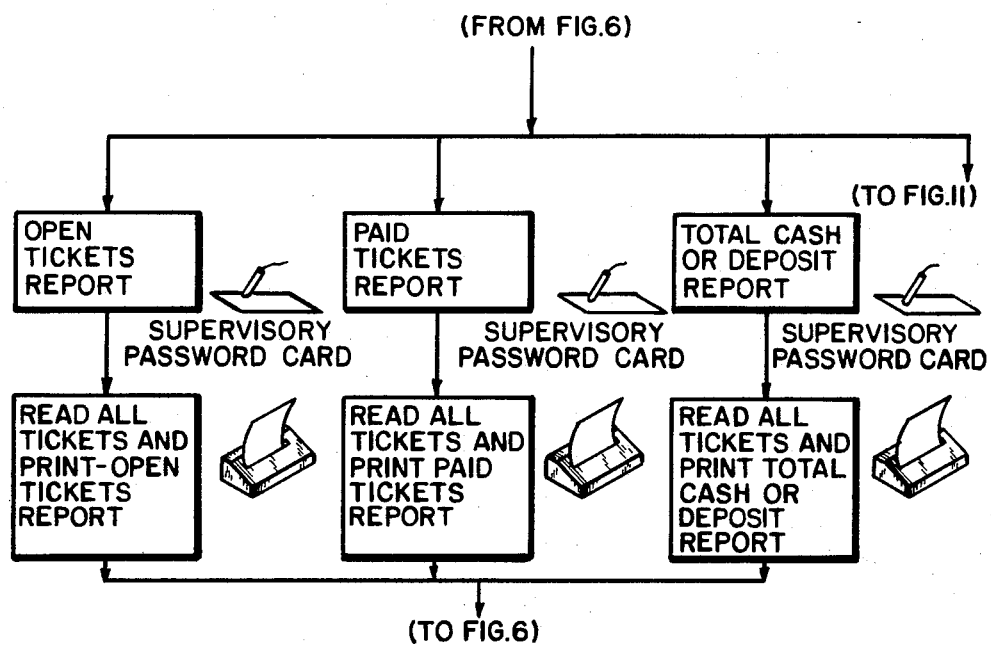

In FIG. 10, that portion of the program is depicted which permits selection of any one of a number of pre-formatted reports. In each instance, it will be noted, the supervisor selects the desired report by scanning the bar code 10 over a authorization card 34 of the type shown in FIG. 4. Once the supervisor identification has been verified, the scanning of any one of the indicia 34b-34g results in the printing of the desired report.

Figure 11:
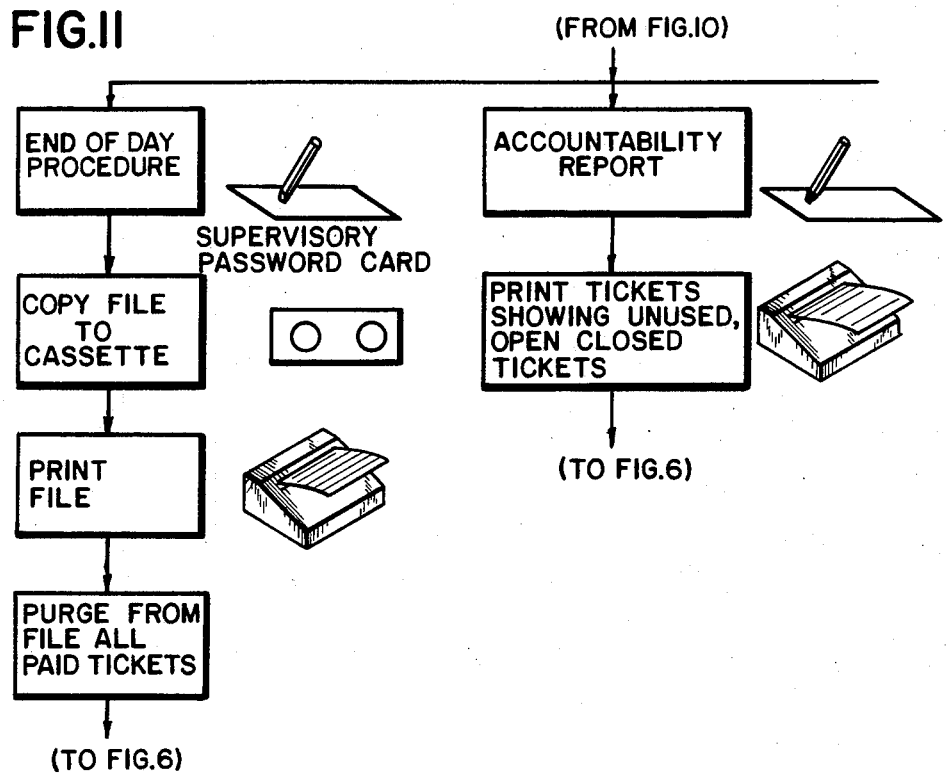
Figure 12:
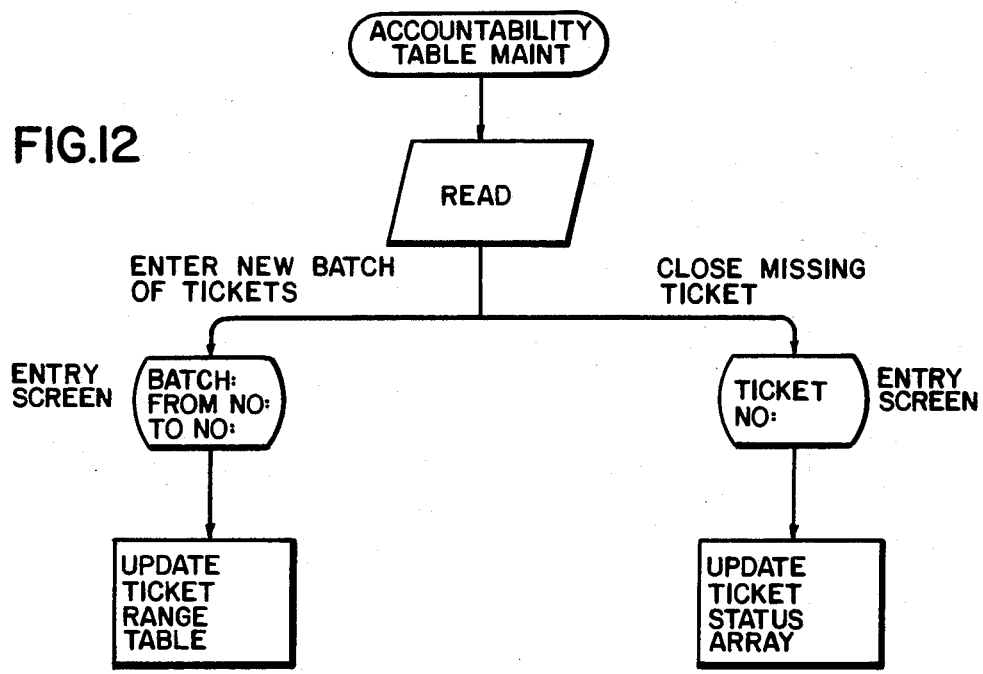

In FIG. 11, the portion of the program is suggested which permits the authorized supervisor to select an end-of-day report. When this is done, the updated file is copied to an external storage medium, such as a magnetic cassette or tape. Additionally, the entire file is printed out, and if desired, all completed events or transactions terminated by the payment of a fee for the parking are purged from the file so that only open tickets remain in the active file.

An important feature of the invention is the control over tickets and their accountability. Still referring to FIG. 10, a supervisory personnel can, by the use of the authorization card 34 select an accountability report which provides a print out regarding completed events, unused, checked in (open) and check out (closed) tickets so that all of the tickets in a series or batch previously identified can be accounted for. In order to maintain the accountability data base complete and accurate, the computer 14 is advantageously programmed to permit the direct entry of information which can either be used to define new batches of tickets provided to the facility. Each batch would normally be identified from a given starting ticket number to a ending ticket number. Upon the entry of this information, the data base is updated to incorporate the new series of batches of tickets. Additionally, a supervisory personnel can, by direct input of specific ticket numbers, close missing tickets or damaged tickets which cannot or have not been used. This inputting of individual ticket numbers deletes these from the accountability data base and these need no longer appear in the accountability reports or, optionally, may be shown as a closed ticket on such accountability report. Again, this information is used to update the accountability file for future reference and audits.

FIGS. 13-16 are representative reports of the type above-mentioned. FIG. 13 illustrates a listing of open tickets, FIG. 14 illustrates a report showing "paid" tickets, FIG. 15 is a report showing deposits or cash receipts, while FIG. 16 is a ticket accountability report providing the status of each ticket in the series or batches of tickets provided to the facility and for accountability must be made.

As suggested above, the use of a programmable computer 16 makes it possible to enlarge or modify the program and the addition of program modules for performing additional and other functions to suit a particular application. Thus, additional modules which may be used in connection with the device 10 are a point-of-sale module, a location pricing module (which may vary from location-to-location), a location password module (which may change the password on a location-by-location basis), and a data collection module. Such data collection modules can be used to transfer stored data to a cassette recorder from the device 10 to a central processing facility where the data can be inputted for further processing. The data collection module can also be used to transfer the stored data over a modem to a remote computer for like processing. Other possible modules include a monthly parking module for monthly parking customers and a credit card module which allows customers to charge their parking fees to a credit card.

While not critical, the device 10 may be provided with a display for displaying the computed fee to be charged to the customer.

It is understood that various changes and modifications may be made by those skilled in the art without departing from the spirit of the invention.

It should be evident that the device in accordance with the present invention provides automatic control in the check out and pricing of parking tickets, replacing manual operations and decisions presently left to the attendant. In addition to closely monitoring the use of parking tickets, the system of the present invention permits management to routinely accummulate an accurate pictures of INS and OUTS and revenues within a garage, for each day of the week, and for each hour of the day.

What is claimed is:

1. A revenue control system for management and pricing of elapsed time events in a parking garage, comprising a multi-part pre-printed ticket which can be severed to provide a plurality of ticket portions one of which serves as a claim check which is provided to a customer after check in at the beginning of the elapsed time event and which is re-used during check out at the end of the elapsed time event, said claim check being provided with pre-printed machine readable ticket indicia; scanning means for scanning and inputting said ticket indicia from said claim check each of which uniquely identifies one elapsed time event; data entry means for entering auxiliary input indicia, using said scanning means, each of which further defines one of said elapsed time events; computer means programmed to check-in and validate each pre-printed machine readable ticket indicia on a claim check at the commencement of each elapsed time event, and to check out, meter and price the associated elapsed time event by reading said pre-printed machine readable ticket indicia on said claim check when the customer returns with the claim check at the termination of the elapsed time event, with storage of said ticket and auxiliary input indicia occuring at both check-in and check-out; and printer means for inprinting selected data on each ticket at both the commencement and termination of each elapsed time event, and for printing reports which included selected output data, whereby check-in and check-out can normally be effected only with the claim check which is always in the customer's possession thereby preventing an attendant from checking out before the customer returns with said claim check.

2. A system as defined in claim 1, wherein said ticket and input indicia are in the nature of bar codes, and said scanning means comprises a bar code reader.

3. A system as defined in claim 2, wherein said data entry means comprises a bar code keyboard.

4. A system as defined in claim 1, wherein said printer means includes a ticket printer for imprinting each ticket.

5. A system as defined in claim 1, wherein said printer means includes a tape printer for printing of reports.

6. A system as defined in claim 1, wherein two ticket portions are provided with related but different ticket indicia, each of said different ticket indicia being useable during check in and check out procedures to render said ticket portions distinguishable during such procedures.

7. A system as defined in claim 1, further comprising authorization means for only enabling said computer and printer means to print reports authorized by said authorization means.

8. A system as defined in claim 7, wherein said authorization means comprises an authorization card provided with authorization indicia which can be scanned by said scanning means.

9. A system as defined in claim 8, wherein said authorization indicia includes personnel identification indicia and report indicia, whereby authorized personnel can scan selected report indicia for causing corresponding reports to be printed.

10. A system as defined in claim 1, further comprising system inhibiting means for selectively inhibiting the continued operation of the system, whereby an operator can cease to attend the system without the danger of unauthorized use thereof.

11. A system as defined in claim 10, wherein said inhibiting means comprises a locking card provided with inhibiting indicia which can be scanned by said scanning means.

12. A system as defined in claim 11, wherein said inhibiting indicia includes personnel identification indicia and locking indicia, whereby authorized personnel can scan said locking indicia for inhibiting the further use of the system.

13. A system as defined in claim 1, wherein said computer means is programmed to execute a plurality of program modules in producing the output data.

14. A system as defined in claim 13, wherein one of said program modules receives the data representing ticket and input indicia and issues an error signal if the same ticket indicia has been previously checked in and storing the data representing the ticket and input indicia, and date and time of check in in the absence of previous check in of the respective ticket indicia.

15. A system as defined in claim 14, wherein said one of said program modules receives the data representing ticket indicia and issues an error signal if the same ticket indicia was not previously checked in and storing the date and time of check out.

16. A system as defined in claim 15, wherein a charge is to be made for the elapsed time between check in and check out in accordance with fee schedules each represented by an out code, further comprising out code indicia which can be scanned to select a desired out code, said one of said program modules receiving the data representing the selected out code to compute and save the price to be charged.

17. A system as defined in claim 16, wherein the ticket includes two detachable ticket portions each provided with related but different ticket indicia, one ticket portion being used during check in and normally returned during check out, said program module being capable of receiving data representing the ticket indicia on the other ticket portion to provide an alternate mode of check out in the event of loss of said one ticket portion.

18. A system as defined in claim 13, further comprising external storage means, said one of said program modules saving all output data on said external storage means in response to reception of data representing a command to initiate an end of day procedure and purging all output data corresponding to completed events upon the check out of a predetermined ticket.

19. A system as defined in claim 13, wherein said one of said program modules proceses the data representing all ticket and input indicia and generates an accountability report in response to reception of data representing a command to initiate search report which includes information regarding completed events, unused, checked in (open) and checked out (closed) tickets.

20. A system as defined in claim 13, further comprising a point of sale module.

21. A system as defined in claim 13, further comprising a location pricing module.

22. A system as defined in claim 13, further comprising a location password module.

23. A system as defined in claim 13, further comprising a data collection module for transferring stored data to a cassette recorder.

24. A system as defined in claim 13, further comprising a data collection module for transferring stored data over a modem to a remote computer.

25. A system as defined in claim 13, further comprising a monthly parker module.

26. A system as defined in claim 13, further comprising a credit card module.

27. A system as defined in claim 1, further comprising display means for displaying a fee to be charged generated by said computer means.

28. A system as defined in claim 1, further comprising communication means cooperating with said computer means for transferring selected output data to a remote location for storage and/or processing.

29. A method of controlling and managing revenue and pricing of elapsed time events in a parking garage, by using a multi-part pre-printed ticket which can be severed to provide a plurality of ticket portions one of which serves as a claim check which is provided to a customer after check in at the beginning of the elapsed time event and which is re-used during check out at the end of the elapsed time event, said claim check being provided with pre-printed machine readable ticket indicia, comprising the steps of scanning and inputting said ticket indicia from said claim check each of which uniquely identifies one elapsed time event; entering auxiliary input data each of which further defines one of said elapsed time events; checking in and validating each pre-printed machine readable ticket indicia on a claim check at the commencement of each elapsed time event, and checking out, metering, and pricing the associated time event by reading said pre-printed machine readable ticket indicia on said claim check when the customer returns with the claim check at the termination of the elapsed time event; storing said ticket and auxiliary input indicia during both check-in and check-out; and printing reports which include selected output data, whereby check-in and check-out can normally be effected only with the claim check which is always in the customer's possession thereby preventing an attendant from checking out before the customer returns with said claim check.

* * * * *